(12) United States Patent
Duhovnikov et al.

(10) Patent No.: US 12,176,728 B2
(45) Date of Patent: Dec. 24, 2024

(54) METHODS AND SYSTEMS FOR WIRELESS POWER TRANSFER

(71) Applicant: AIRBUS DEFENCE AND SPACE GMBH, Taufkirchen (DE)

(72) Inventors: Svetoslav Duhovnikov, Munich (DE); Aygün Baltaci, Munich (DE); Andreas Drexler, Munich (DE); Bernd Schleicher, Ebersberg (DE); Jan Tepper, Munich (DE); Dominic Schupke, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 153 days.

(21) Appl. No.: 17/126,511

(22) Filed: Dec. 18, 2020

(65) Prior Publication Data

US 2021/0194292 A1    Jun. 24, 2021

(30) Foreign Application Priority Data

Dec. 20, 2019  (DE) ..................... 10 2019 220 462.7

(51) Int. Cl.
*H02J 50/40* (2016.01)
*B64D 41/00* (2006.01)
*H02J 50/20* (2016.01)
*H02J 50/80* (2016.01)
*H04W 52/46* (2009.01)

(52) U.S. Cl.
CPC ............. *H02J 50/40* (2016.02); *B64D 41/00* (2013.01); *H02J 50/20* (2016.02); *H02J 50/80* (2016.02); *H04W 52/46* (2013.01); *B64D 2221/00* (2013.01)

(58) Field of Classification Search
None
See application file for complete search history.

(56) References Cited

U.S. PATENT DOCUMENTS 10,211,682 B2  2/2019  Bell et al.
10,333,357 B1  6/2019  Abu Qahouq
(Continued)

FOREIGN PATENT DOCUMENTS

DE  102016221474 A1  5/2018
DE  102016224804 A1  6/2018
EP      3148052 A1  3/2017

OTHER PUBLICATIONS

German Office Action for Application No. 10 2019 220 462.7 dated Sep. 30, 2020.
(Continued)

*Primary Examiner* — Daniel Kessie
(74) *Attorney, Agent, or Firm* — KDW Firm PLLC

(57) ABSTRACT

Systems for wireless power transfer (WPT) include one or more WPT transmission devices and one or more WPT receiver devices to wirelessly receive power transmitted by the one or more WPT transmission devices. The WPT receiver devices are arranged at a fixed position relative to each of the WPT transmission devices. A WPT transmit controller of the systems is coupled to the one or more WPT transmission devices to control WPT transmission properties of the one or more WPT transmission devices in order to harmonize and adapt the transmit power level at the fixed position of the one or more WPT receiver devices.

10 Claims, 2 Drawing Sheets

(56) References Cited

U.S. PATENT DOCUMENTS

| | | | |
|---|---|---|---|
| 2008/0227478 A1* | 9/2008 | Greene | H02J 50/20 |
| | | | 455/522 |
| 2016/0359379 A1 | 12/2016 | Zeine et al. | |
| 2017/0070101 A1* | 3/2017 | Kim | H02J 50/12 |
| 2018/0026481 A1 | 1/2018 | Ku et al. | |
| 2019/0178924 A1 | 6/2019 | Adolf | |
| 2019/0280532 A1* | 9/2019 | Matsuo | H02J 50/20 |
| 2019/0308514 A1 | 10/2019 | Parimi et al. | |
| 2020/0389054 A1* | 12/2020 | Vedady Moghadam Nanehkaran | H02J 7/0047 |

OTHER PUBLICATIONS

European Search Report for Application No. 20214447 dated May 18, 2021.

* cited by examiner

METHODS AND SYSTEMS FOR WIRELESS POWER TRANSFER

CROSS-REFERENCE TO RELATED APPLICATION

This application claims priority to German Patent Application DE 10 2019 220 462.7 filed Dec. 20, 2019, the entire disclosure of which is incorporated by reference herein.

TECHNICAL FIELD

The disclosure herein pertains to methods and systems for wireless power transfer, particularly for use in providing power to wireless components of wireless networks.

BACKGROUND

Aircraft design, production and maintenance involves the challenge of cabling. Copper wires and connectors significantly contribute to an aircraft's weight which is undesirable when trying to reduce fuel consumption and emission of greenhouse gases.

Wireless communications can be used to replace on-board cables of some communication sensors via exploiting short-distance radio communications to transfer data between sensors or actuators. This improves operating and maintenance. There are different categories for wireless connected sensor applications that depend on data rate and location of the sensor within the aircraft. Each of those categories contains a number of sensors on board of an aircraft which must be equipped with wireless capability. Those sensors transmit observational sensor data to gateways on board over wireless channels so that the aircraft may be efficiently and reliably operated without having to rely on extensive cabling.

The components of these wireless environments, such as sensors and other network nodes, require power to operate. Such powering is usually still reliant on employment of batteries or accumulators or wirebound power lines connecting the components to an on-board energy supply.

To overcome the challenges of powering the wireless components, wireless power transfer (WPT) is a promising technology. In WPT, power is transferred wirelessly over the air (OTA) to receiving components which convert the received power to direct current (DC) power via converters. The DC power can be used instantaneously or stored in capacitors to allow a duty cycle operation of the involved sensors.

Among the WPT transfer methods discussed, like e.g. ultra-sound, vibration, inductive/capacitive coupling, light/laser, thermal or other transfer methods, with all methods having its pro's and con's, here radio frequency (RF) power transfer is used. Radio-frequency (RF) WPT is a widely adopted radiative method that utilizes radio signals at a given operational frequency and allowable transmit power and using well adopted components for establishing the RF WPT. Key component in the link is the RF-to-DC converter, which converts the received RF power signal into a DC power to completely operate the connected sensor from the acquired energy.

Document US 2018/0026481 A1 discloses WPT technologies based on power waveforming. Document DE 10 2016 221 474 A1 discloses an electric vehicle charging grid with multiple adjacent charging stations that are adaptively operated to mitigate electromagnetic interference between the charging stations. Document DE 10 2016 224 804 A1 discloses a method for determining the position of a charging station for the wireless transmission of electrical energy to a vehicle.

SUMMARY

It is one of the objects of the disclosure herein to find solutions for increasing the power transfer efficiency in wireless power transfer applications, specifically in remotely powering components of wireless networks inside aircraft.

At least some of these objects are achieved by the subject-matter disclosed herein. Some or all of the objects may also be achieved by other teachings incorporated into the present disclosure.

According to a first aspect of the disclosure herein, A system for wireless power transfer (WPT) comprises a plurality of WPT transmission devices with at least pairwise overlapping power transmission coverage and at least one WPT receiver device configured to wirelessly receive power transmitted by the plurality of WPT transmission devices. The at least one WPT receiver device is arranged at a fixed position relative to each of the plurality of WPT transmission devices. The system further comprises a WPT transmit controller coupled to the plurality of WPT transmission devices. The WPT transmit controller is configured to control WPT transmission properties of each of the plurality of WPT transmission devices so that the transmit power levels from the WPT transmission devices at the fixed position of the at least one WPT receiver device lie within a predetermined power level range.

In some embodiments of the first aspect, a minimum power level threshold of the predetermined power level range may be determined by a minimum power level needed to sufficiently provide the at least one WPT receiver device with electric power. In some embodiments, a maximum power level threshold of the predetermined power level range may be determined by a maximum power level supported by the power supply specifications of the at least one WPT receiver device. This has the advantage that constructive and destructive interference patterns arising from flat-fading when operating multiple transmitters in a complex reflective environment may be avoided. Locally strong electric fields may be prevented from appearing at certain locations which would exceed an allowable range—a requirement specifically desirable in avionics settings. At the same time, all receiver devices are guaranteed to be supplied with a minimum power at all times in order to have sufficiently reliable uptime of the receiver devices.

In some embodiments of the first aspect, each of the plurality of WPT transmission devices may be configured to perform radiative radio frequency WPT. Radiative radio frequency (RF) WPT, i.e. far-field WPT based on omnidirectionally emitted electromagnetic radiation may be less efficient than directed radiative power transfer, but is sufficiently efficient on lower to medium distances. The benefits of Radiative RF WPT are less impact of attenuation and alignment issues on the actual power transfer function, thus increasing flexibility and simplicity of the WPT architecture.

In some embodiments of the first aspect, the system may further comprise a retransmission receiver coupled to the WPT transmit controller, the retransmission receiver being configured to receive a transmit power level indication signal from the at least one WPT receiver device indicating the measured received power level at the position of the at least one WPT receiver device. In some embodiments thereof, the retransmission receiver may include a receive antenna configured to receive the transmit power level indication signal from the at least one WPT receiver device wirelessly. The WPT transmit controller may in some embodiments be configured to adjust the WPT transmission properties of each of the plurality of WPT transmission devices based on the received transmit power level indication signal from the at least one WPT receiver device. Such a retransmission receiver provides for an advantageous feedback loop from the receiver device so that the WPT transmit controller is able to dynamically optimize the WPT transmission properties based on real measurements of the actual power received at the receiver devices. The wireless properties of the retransmission equipment do not necessarily need to use the same parameters such as transmission frequency or bandwidth as the WPT transmission and receiver devices.

In some embodiments of the first aspect, the WPT transmission properties controlled by WPT transmit controller may include one or more of individual phases of the radiated sinusoidal or multi-tone output signals of the WPT transmission devices, timing of the transmission during on/off time in duty-cycle operation of the WPT transmission devices, frequency spacing for spread-spectrum emission of the WPT transmission devices and variation of modulation schemes of the RF transmission of the WPT transmission devices.

According to a second aspect of the disclosure herein, a method for wireless power transfer (WPT) between a plurality of WPT transmission devices with at least pairwise overlapping power transmission coverage and at least one WPT receiver device configured to wirelessly receive power transmitted by the plurality of WPT transmission devices is disclosed. The method involves the steps of arranging the at least one WPT receiver device at a fixed position relative to each of the plurality of WPT transmission devices, and controlling, by a WPT transmit controller, WPT transmission properties of the at least one WPT transmission device so that the transmit power levels from the WPT transmission device at the fixed position of the at least one WPT receiver device lie within a predetermined power level range.

In some embodiments of the second aspect, a minimum power level threshold of the predetermined power level range may be determined by a minimum power level needed to sufficiently provide the at least one WPT receiver device with electric power. In some embodiments of the second aspect, a maximum power level threshold of the predetermined power level range may be determined by a maximum power level supported by the power supply specifications of the at least one WPT receiver device. This has the advantage that constructive and destructive interference patterns arising from flat-fading when operating multiple transmitters in a complex reflective environment may be avoided. Locally strong electric fields may be prevented from appearing at certain locations which would exceed an allowable range—a requirement specifically desirable in avionics settings. At the same time, all receiver devices are guaranteed to be supplied with a minimum power at all times in order to have sufficiently reliable uptime of the receiver devices.

In some embodiments of the second aspect, each of the plurality of WPT transmission devices may be configured to perform radiative radio frequency WPT. Radiative radio frequency (RF) WPT, i.e. far-field WPT based on omnidirectionally emitted electromagnetic radiation may be less efficient than directed radiative power transfer, but is sufficiently efficient on lower to medium distances. The benefits of Radiative RF WPT are less impact of attenuation and alignment issues on the actual power transfer function, thus increasing flexibility and simplicity of the WPT architecture.

In some embodiments of the second aspect, the method may further involve the step of receiving, by a retransmission receiver, a transmit power level indication signal from the at least one WPT receiver device indicating the measured received power level at the position of the at least one WPT receiver device. In some embodiments thereof, receiving the transmit power level indication signal from the at least one WPT receiver device may be performed wirelessly. Controlling the WPT transmission properties of each of the plurality of WPT transmission devices may in some cases include adjusting the WPT transmission properties of each of the plurality of WPT transmission devices based on the received transmit power level indication signal from the at least one WPT receiver device. Receiving transmit power level indication signals as feedback advantageously enables the adjustment of the WPT transmission properties to be dynamically optimized based on real measurements of the actual power received at the receiver devices.

In some embodiments of the second aspect, controlling the WPT transmission properties includes one or more of controlling individual phases of the radiated sinusoidal or multi-tone output signals of the WPT transmission devices, controlling timing of the transmission during on/off time in duty-cycle operation of the WPT transmission devices, controlling frequency spacing for spread-spectrum emission of the WPT transmission devices and controlling variation of modulation schemes of the RF transmission of the WPT transmission devices.

According to a third aspect of the disclosure herein, a system for wireless power transfer (WPT) comprises at least one WPT transmission device, and a plurality of WPT receiver devices configured to wirelessly receive power transmitted by the at least one WPT transmission device, the plurality of WPT receiver devices each being arranged at a fixed position relative to the at least one WPT transmission device. The system further comprises a WPT transmit controller coupled to the plurality of WPT transmission devices. The WPT transmit controller is configured to control WPT transmission properties of each of the plurality of WPT transmission devices on the basis of the geographical location of the system for WPT.

According to a fourth aspect of the disclosure herein, a method for wireless power transfer (WPT) between at least one WPT transmission device and a plurality of WPT receiver devices configured to wirelessly receive power transmitted by the at least one WPT transmission device is disclosed. The method involves the steps of arranging each of the plurality of WPT receiver devices at a fixed position relative to the at least one WPT transmission device, determining the geographical location of the at least one WPT transmission device, and controlling, by a WPT transmit controller, WPT transmission properties of at least one WPT transmission device on the basis of the determined geographical location of the at least one WPT transmission device.

National regulation authorities typically allocate a radio frequency (RF) band to specific RF emission types. The system and method of the third and fourth aspect, respectively, have the advantage that specific regulation requirements like maximal transmit power, bandwidth, timing pattern, antenna beams, mitigation techniques and similar properties of WPT devices may be dynamically adjusted when the system is moved from one geographical location to another without having to resort to specifically tailored system solutions for each location. Specifically for WPT architectures on-board or aircraft this is very beneficial since aircraft regularly move from one geographical location to another.

In some embodiments of the third aspect, the system may further comprise a geolocation or ground position device, like for example a global navigation satellite system (GNSS) receiver coupled to the WPT transmit controller, the GNSS receiver being configured to receive a positioning signal of a GNSS indicating the geographical location of the system for WPT. In some of those embodiments, the WPT transmit controller may be configured to adjust a maximum power level threshold at each of the fixed positions of the plurality of WPT receiver devices, the maximum power level threshold corresponding to a maximum power level allowed for the plurality of WPT receiver devices depending on the received positioning signal of the GNSS. In some embodiments of the fourth aspect, determining the geographical location of the at least one WPT transmission device may include receiving, by a global navigation satellite system receiver coupled to the WPT transmit controller, a positioning signal of a GNSS indicating the geographical location of the at least one WPT transmission device. In some embodiments thereof, controlling the WPT transmission properties of at least one WPT transmission device includes adjusting a maximum power level threshold at each of the fixed positions of the plurality of WPT receiver devices, the maximum power level threshold corresponding to a maximum power level allowed for the plurality of WPT receiver devices depending on the received positioning signal of the GNSS.

The WPT transmission devices may advantageously be software programmable field devices that have a configuration memory for storing a plurality of predetermined configurations of operational parameters. Depending on the received GNSS positioning signal, the WPT transmit controller may selectively choose one of the pre-installed configurations to operate the WPT transmission devices. Thus, it can be advantageously ensured that a WPT system is globally enabled by changing the WPT transmission properties dynamically according to the current geolocation. Moreover, even if national regulations are updated or changed, the hardware of existing WPT systems may stay the same as only software updates for the pre-installed configurations sets need to be applied.

In some embodiments of the third and fourth aspect, the at least one WPT transmission device may be configured to perform radiative radio frequency WPT. Radiative radio frequency (RF) WPT, i.e. far-field WPT based on omnidirectionally emitted electromagnetic radiation may be less efficient than directed radiative power transfer, but is sufficiently efficient on lower to medium distances. The benefits of Radiative RF WPT are less impact of attenuation and alignment issues on the actual power transfer function, thus increasing flexibility and simplicity of the WPT architecture.

In some embodiments of the third and fourth aspect, the WPT transmission properties controlled by WPT transmit controller include one or more of individual phases of the radiated sinusoidal or multi-tone output signals of the at least one WPT transmission device, timing of the transmission during on/off time in duty-cycle operation of the at least one WPT transmission device, frequency spacing for spread-spectrum emission of the at least one WPT transmission device and variation of modulation schemes of the RF transmission of the at least one WPT transmission device.

According to a fifth aspect of the disclosure herein, an aircraft includes a system according to any of the first and third aspects. In some embodiments, the WPT receiver device(s) is/are sensors of a wireless communication network.

Wireless communication networks rely on a plurality of sensor and actuator units in an aircraft that benefit greatly from being powered wirelessly. One potential scenario is the powering of electronics in passenger seats inside an aircraft cabin. Wirelessly powering them allows re-arranging seats without having to re-arrange the wiring cables as well. This increases flexibility, maintainability and reduces installation costs. Moreover, a multitude of receiver devices may be powered simultaneously by only a few WPT transmitter devices within the whole cabin environment since sensors and actuators in a wireless communication network typically consume but little average power. Particularly advantageous is the wireless powering of receiver devices with duty-cycle operation, i.e. devices that are typically built to store electrically harvested energy in a storage capacitor and start their operation when a certain charging level is reached. Typical operational repetition rates are from few seconds to several minutes so that a small number of WPT transmitter devices can be responsible for powering a much larger number of such receiver devices with duty-cycle operation.

BRIEF DESCRIPTION OF THE DRAWINGS

The disclosure herein will be explained in greater detail with reference to exemplary embodiments depicted in the drawings as appended.

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. Like reference numerals designate corresponding similar parts.

Figure 1:
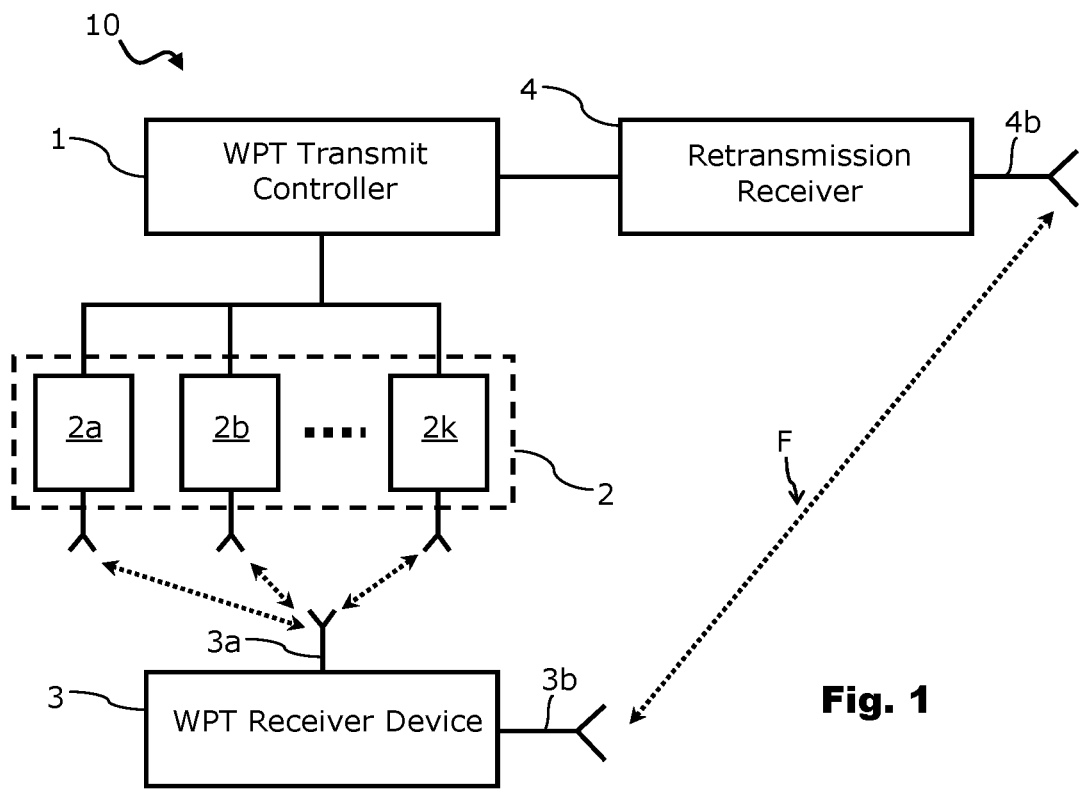
FIG. 1 schematically illustrates a block diagram of an exemplary first system for wireless power transfer according to some embodiments of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

Figure 2:
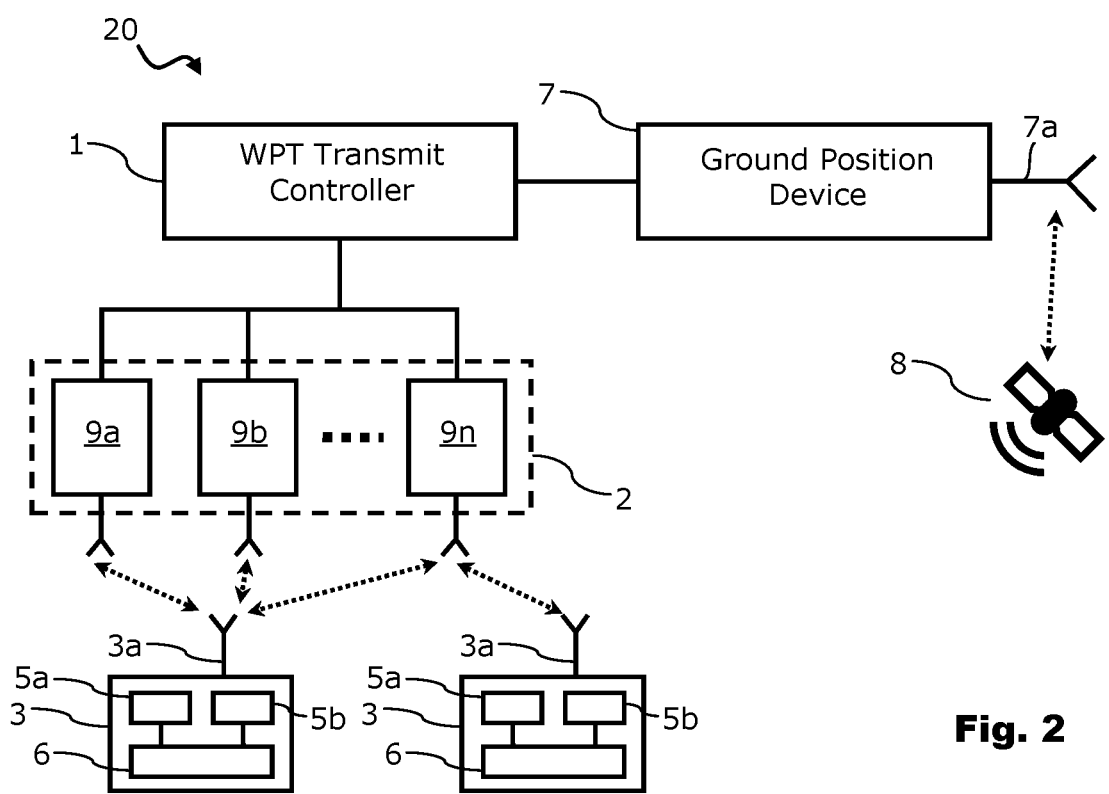
FIG. 2 schematically illustrates a block diagram of an exemplary second system for wireless power transfer according to some embodiments of the disclosure herein.

FIGS. 1 and 2 disclose systems for wireless power transfer. While some features and elements of the systems are only shown in conjunction with one of the FIGS. 1 and 2, it should be clear that features and elements of the system of FIG. 1 may be implemented in the system of FIG. 2 and vice versa.

Figure 5:
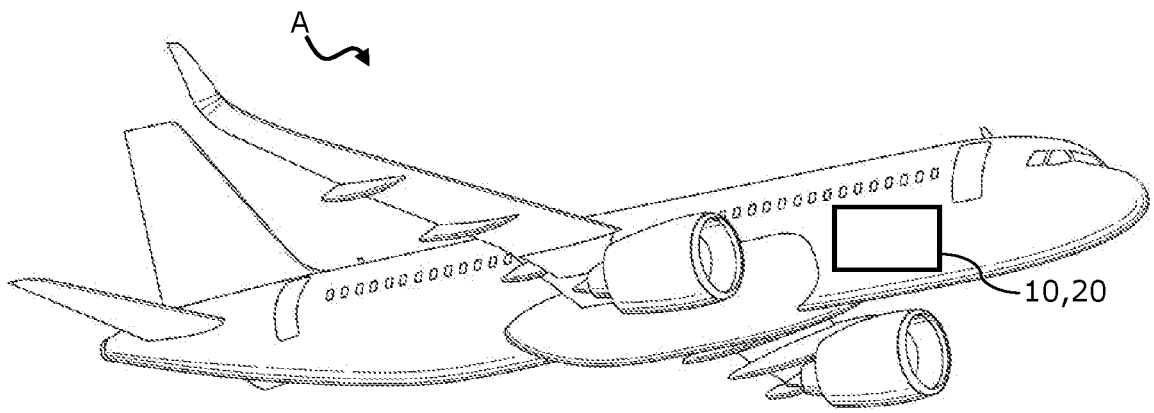
FIG. 5 schematically illustrates an aircraft having a system for wireless power transfer according to some embodiments of the disclosure herein.

FIG. 1 discloses an exemplary configuration of a system 10 for wireless power transfer (WPT). The system 10 may for example be implemented in an aircraft such as the aircraft A as shown in FIG. 5. The system 10 may for example be implemented in a wireless avionics intra-communication (WAIC) network of an aircraft.

The system 10 includes a plurality of WPT transmission devices 2a, 2b to 2k with at least pairwise overlapping power transmission coverage. Although there are only three WPT transmission devices 2a, 2b to 2k explicitly shown in FIG. 1, it should be understood that any other number of WPT transmission devices may be equally possible. In particular, a system 10 may in reality include a lot more than just three WPT transmission devices 2a, 2b to 2k. The WPT transmission devices may be collectively referred to as WPT supply system 2. The WPT transmission devices 2a, 2b to 2k may be distributed over the WPT environment depending on the intended coverage of the system 10. The WPT transmission devices particularly support radiative radio frequency (RF) WPT, i.e. far-field omnidirectional radiative power transmission by electromagnetic waves. The WPT transmission devices 2a, 2b to 2k may be adjustable in their WPT transmission properties, for example in their individual phases of the radiated sinusoidal or multi-tone output signals, their timing of the transmission during on/off time in duty-cycle operation, their frequency spacing for spread-spectrum emission and/or their variation of modulation schemes of the RF transmission.

The system 10 includes at least one WPT receiver device 3 that is configured to wirelessly receive power transmitted by some or all of the plurality of WPT transmission devices 2a, 2b and 2k. Typically, the WPT receiver device 3 is arranged at a fixed position relative to each of the WPT transmission devices 2a to 2k in an environment such as an aircraft cabin. The WPT receiver device 3 includes a receive antenna 3a which is configured to harvest electrical energy received over-the-air (OTA) by respective antenna of the WPT transmission devices. The WPT receiver device 3 may be any remotely powered device such as a network component, a sensor or an actuator. The WPT receiver device 3 further includes (not explicitly shown) circuitry to convert the received wireless power to DC current and optional storage like a rechargeable battery or a supercapacitor to at least temporarily store the harvested electrical energy.

The system 10 further includes a WPT transmit controller 1 that is coupled to each of the plurality of WPT transmission devices 2a, 2b, and 2k. The WPT transmit controller 1 is able to control the WPT transmission properties of each of the WPT transmission devices 2a, 2b, 2k. In particular, the WPT transmit controller 1 controls the WPT transmission properties in such a way that the transmit power levels at the fixed position of the WPT receiver device 3 lie within a predetermined power level range. Specifically, the WPT transmit controller 1 ensures by controlling the operational state of the WPT transmission devices that the available electrically harvestable transmission power at the fixed position does neither fall below a predefinable minimum power level nor exceed a maximum power level. For example, the minimum power level threshold may be determined by a minimum power level which is needed to sufficiently provide the WPT receiver device 3 with electric power for its intended functionality. The maximum power level threshold may be determined by a maximum power level that is supported by the power supply specifications of the WPT receiver device 3 or a maximum power level that is allowable under regulations for operating the WPT receiver device 3.

The system 10 further includes a retransmission receiver 4 that is coupled to the WPT transmit controller 1. The retransmission receiver 4 is equipped with a receive antenna 4b to which the WPT receiver device 3 may wirelessly send a transmit power level indication signal F via a transmission antenna 3b. The transmit power level indication signal F indicates the measured received power level at the position of the WPT receiver device 3. The retransmission receiver 4 relays the information about the received power level at the position of the WPT receiver device 3 to the WPT transmit controller 1 which in turn is able to adjust the WPT transmission properties of the WPT transmission devices 2a, 2b, 2k, taking into account the measured or detected received power level of the WPT receiver device 3. The WPT receiver device 3 may directly measure the power level or may indirectly detect the received power level on the basis of other parameters that have an influence on the received power level, for example by measuring the repetition rate of two or more re-transmissions.

If, for example, the measured received power level is deemed to be too high or too low or may be fluctuating too much, the WPT transmit controller 1 may alter the control of the WPT transmission properties of the WPT transmission devices individually or based on a common adjustment scheme. The success of such adjustment measures may be retrieved by way of the feedback loop over the WPT receiver device 3 and the retransmission receiver 4.

FIG. 2 discloses another exemplary configuration of a system 20 for wireless power transfer (WPT). The system 20 may for example be implemented in an aircraft such as the aircraft A as shown in FIG. 5. The system 20 may for example be implemented in a wireless avionics intra-communication (WAIC) network of an aircraft.

The system 20 includes at least one WPT transmission device 2 which may for example include multiple different transmission units 9a, 9b, 9n having different pre-set WPT transmission properties. Alternatively, the WPT transmission device 2 may be software programmable so that the WPT transmission properties of the WPT transmission device 2 may be adjusted by way of different adjustable sets of configuration for the WPT transmission device 2. Although there are only three different transmission units 9a, 9b, 9n explicitly shown in FIG. 2, it should be understood that any other number of transmission units may be equally possible. Moreover, the WPT transmission device 2 may include a (not explicitly shown) configuration storage in which different adjustable sets of configuration for the WPT transmission device 2 may be pre-installed.

The WPT transmission device 2 particularly supports radiative radio frequency (RF) WPT, i.e. far-field omnidirectional radiative power transmission by electromagnetic waves. The WPT transmission device 2 may be adjustable in its WPT transmission properties, for example in their individual phases of the radiated sinusoidal or multi-tone output signals, their timing of the transmission during on/off time in duty-cycle operation, their frequency spacing for spread-spectrum emission and/or their variation of modulation schemes of the RF transmission. It may also be possible for the different transmission units 9a, 9b, 9n to have respectively different WPT transmission properties.

The system 10 includes a number of WPT receiver devices 3 that are configured to wirelessly receive power transmitted by the at least one WPT transmission device. Typically, the WPT receiver devices 3 are each arranged at a fixed position relative to the WPT transmission device in an environment such as an aircraft cabin. The WPT receiver devices 3 each include a receive antenna 3a which is configured to harvest electrical energy received over-the-air (OTA) by respective antenna of the WPT transmission device 2. The WPT receiver devices 3 may be any remotely powered device such as a network component, a sensor or an actuator.

The WPT receiver devices 3 further include circuitry 5a, 5b to convert the received wireless power to DC current and optionally storage like a rechargeable battery or a supercapacitor to at least temporarily store the harvested electrical energy. In particular, the WPT receiver devices 3 may include two or more different converter circuits for converting broadband RF to DC. A first RF-to-DC converter 5a may be able to receive emitted RF power with a first bandwidth, modulation and timing scheme and a second RF-to-DC converter 5b may be able to receive emitted RF power with a second bandwidth, modulation and timing scheme, which may be different from the first bandwidth, modulation and timing scheme of the first RF-to-DC converter 5a. The converters 5a and 5b are coupled in parallel to the processing circuitry 6 of the WPT receiver devices 3 so that either of the converters 5a and 5b may be selectively used to provide power to the processing circuitry 6, depending on the characteristics of the wirelessly received power at the antenna 3a.

The system 10 further includes a WPT transmit controller 1 that is coupled to the WPT transmission device 2. The WPT transmit controller 1 is able to control the WPT transmission properties of the WPT transmission device 2. In particular, the WPT transmit controller 1 controls the WPT transmission properties in such a way that the transmit power levels at the fixed position of the WPT receiver device 3 lie within a predetermined power level range that may vary depending on the geographical location of the system 20. Specifically, the WPT transmit controller 1 ensures by controlling the operational state of the WPT transmission device 2 that the available electrically harvestable transmission power at the fixed position does neither fall below a predefinable minimum power level nor exceed a maximum power level. For example, the minimum and maximum power level thresholds may depend on national regulations that apply in different countries or regions. By adjusting the minimum and maximum power level thresholds based on the geolocation of the system 20, the WPT transmit controller 1 is able to ensure full compliance with external regulations of the whole system 20 at all times.

The system 20 further includes a geolocation or ground position device 7, like for example a global navigation satellite system (GNSS) receiver 7 coupled to the WPT transmit controller 1, for example a Galileo receiver, a GPS receiver, a GLONASS receiver or a Beidou receiver. The GNSS receiver 7 is configured to receive a positioning signal of a GNSS 8 that indicates the current geographical location of the system 20. If another geolocation or ground position device 7 than a GNSS receiver 7 is used, it may be possible to receive another type of geolocation or ground position signal for indicating the current geographical location of the system 20. The WPT transmit controller 1 is configured to adjust a maximum power level threshold at each of the fixed positions of the plurality of WPT receiver devices 3. The maximum power level threshold may for example corresponding to a maximum power level allowed for the plurality of WPT receiver devices 3 depending on the received positioning signal of the GNSS 8.

Alternatively, it may also be possible to determine the geolocation of the system 20 by other means than a GNSS. For example, it may be possible for the system 20 to log onto a local or regional wireless RF network and determine geographical position from there.

Figure 3:
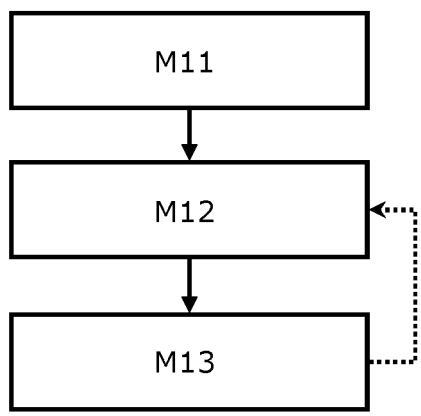
FIG. 3 schematically illustrates a flow diagram of a method for wireless power transfer in the first system of FIG. 1 according to some embodiments of the disclosure herein.
Figure 4:
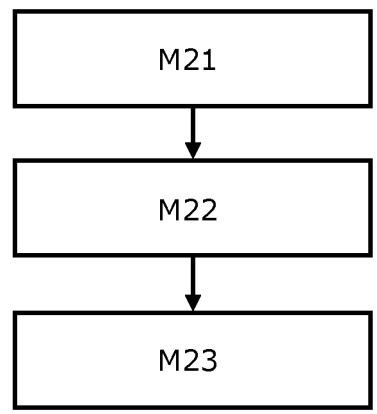
FIG. 4 schematically illustrates a flow diagram of a method for wireless power transfer in the second system of FIG. 2 according to some embodiments of the disclosure herein.

FIGS. 3 and 4 schematically illustrate flow diagrams of methods M1 and M2, respectively, for wireless power transfer (WPT) between WPT transmission devices and WPT receiver devices. The method M1 of FIG. 3 may for example be implemented using a system 10 as depicted and explained in conjunction with FIG. 1. The method M2 of FIG. 4 may for example be implemented using a system 20 as depicted and explained in conjunction with FIG. 2.

In a first step M11, the method M1 includes arranging a WPT receiver device 3 at a fixed position relative to each of the plurality of WPT transmission devices. A WPT transmit controller 1 is then used in a step M12 to control WPT transmission properties of each of the plurality of WPT transmission devices so that the transmit power levels from the WPT transmission devices at the fixed position of the at least one WPT receiver device 3 lie within a predetermined power level range. A minimum power level threshold of the predetermined power level range may be determined by a minimum power level needed to sufficiently provide the at least one WPT receiver device 3 with electric power. A maximum power level threshold of the predetermined power level range may be determined by a maximum power level supported by the power supply specifications of the at least one WPT receiver device 3.

In an optional third step M13, the method M13 may involve receiving, by a retransmission receiver 4, a transmit power level indication signal F from the at least one WPT receiver device 3, for example by wireless transmission. The transmit power level indication signal F indicates the measured received power level at the position of the at least one WPT receiver device 3. The WPT transmit controller 1 is then able to control the WPT transmission properties of each of the plurality of WPT transmission devices by adjusting their WPT transmission properties, depending on the measured power levels as indicated by the received transmit power level indication signal F. For example, the WPT transmit controller 1 may individually control the individual phases of the radiated sinusoidal or multi-tone output signals of the WPT transmission devices, the timing of the transmission during on/off time in duty-cycle operation of the WPT transmission devices, the frequency spacing for spread-spectrum emission of the WPT transmission devices or the variation of modulation schemes of the RF transmission of the WPT transmission devices.

The method M2 of FIG. 2 includes in a first step M21 an arranging of each of a plurality of WPT receiver devices 3 at a fixed position relative to at least one WPT transmission device 2. In a second step M22, the geographical location of the at least one WPT transmission device 2 is determined, for example by receiving a positioning signal of a global navigation satellite system GNSS 8 indicating the geographical location of the at least one WPT transmission device 2.

Finally, the WPT transmit controller 1 may control in a step M23 WPT transmission properties of at least one WPT transmission device 2 on the basis of the determined geographical location of the at least one WPT transmission device 2. For example, the WPT transmit controller 1 may receive the positioning signal of the GNSS 8 and may adjust a maximum power level threshold at each of the fixed positions of the plurality of WPT receiver devices 3. The maximum power level threshold may for example corresponding to a maximum power level allowed for the plurality of WPT receiver devices 3 depending on the determined geolocation of the WPT system.

For example, the WPT transmit controller 1 may individually control the individual phases of the radiated sinusoidal or multi-tone output signals of the WPT transmission device, the timing of the transmission during on/off time in duty-cycle operation of the WPT transmission device, the frequency spacing for spread-spectrum emission of the WPT transmission device or the variation of modulation schemes of the RF transmission of the WPT transmission device.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for wireless power transfer (WPT), comprising: a plurality of WPT transmission devices distributed about a WPT environment, the plurality of WPT transmission devices comprising a first number of devices, each of the plurality of WPT transmission devices being configured to provide far-field omnidirectionally emitted electromagnetic radiation, the WPT transmission devices being configured to provide at least pairwise overlapping radiative power transmission coverage over the WPT environment; a plurality of WPT receiver devices comprises a second number of devices that is larger than the first number, the plurality of WPT receiver devices being configured to wirelessly receive power transmitted by the plurality of WPT transmission devices simultaneously, the plurality of WPT receiver devices being arranged in the WPT environment at fixed positions relative to each of the plurality of WPT transmission devices; a WPT transmit controller coupled to the plurality of WPT transmission devices and configured to control WPT transmission properties of each of the plurality of WPT transmission devices so that the transmit power levels from the WPT transmission devices at the fixed positions of each of the plurality of WPT receiver devices lie within a predetermined power level range; and a retransmission receiver coupled to the WPT transmit controller, the retransmission receiver being configured to receive a transmit power level indication signal from the plurality of WPT receiver devices indicating a measured or detected received power level at the fixed positions of each of the plurality of WPT receiver devices; wherein the WPT transmit controller is configured to adjust the WPT transmission properties of each of the plurality of WPT transmission devices based on the received transmit power level indication signal from the plurality of WPT receiver devices; wherein a minimum power level threshold of the predetermined power level range is determined by a minimum power level needed to provide electric power for an intended functionality of the plurality of WPT receiver devices; and wherein a maximum power level threshold of the predetermined power level range is determined by a maximum power level supported by the power supply specifications of the plurality of WPT receiver devices and wherein the WPT transmission properties controlled by WPT transmit controller include one or more of individual phases of the radiated sinusoidal or multi-tone output signals of the WPT transmission devices, timing of the transmission during on/off time in duty-cycle operation of the WPT transmission devices, frequency spacing for spread-spectrum emission of the WPT transmission devices and variation of modulation schemes of the RF transmission of the WPT transmission devices.

2. The system of claim 1, wherein a minimum power level threshold of the predetermined power level range is determined by a minimum power level needed to sufficiently provide each of the plurality of WPT receiver devices with electric power.

3. The system of claim 1, wherein each of the plurality of WPT transmission devices is configured to perform radiative radio frequency (RF) WPT.

4. The system of claim 1, wherein the retransmission receiver includes a receive antenna configured to receive the transmit power level indication signal from the plurality of WPT receiver devices wirelessly.

5. A method for wireless power transfer (WPT) between a plurality of WPT transmission devices distributed about a WPT environment, each of the plurality of WPT transmission devices being configured to provide far-field omnidirectionally emitted electromagnetic radiation, the WPT transmission devices being configured to provide at least pairwise overlapping radiative power transmission coverage over the WPT environment and a plurality of WPT receiver devices configured to wirelessly receive radiative power transmission coverage over the WPT environment and the plurality of WPT receiver devices configured to wirelessly receive power transmitted by the plurality of WPT transmission devices simultaneously, the method comprising; arranging the plurality of WPT receiver devices in the WPT environment at fixed positions relative to each of the plurality of WPT transmission devices, wherein the plurality of WPT transmission devices comprises a first number of devices, and wherein the plurality of WPT receiver devices comprises a second number of devices that is larger than the first number; receiving, by a retransmission receiver, a transmit power level indication signal from the plurality of WPT receiver devices indicating a measured or detected received power level at the fixed positions of the plurality of WPT receiver devices; and controlling, by a WPT transmit controller, WPT transmission properties of each of the plurality of WPT transmission devices so that the transmit power levels from the WPT transmission devices at the fixed positions of each of the plurality of WPT receiver devices lie within a predetermined power level range; wherein controlling the WPT transmission properties of each of the plurality of WPT transmission devices includes adjusting the WPT transmission properties of each of the plurality of WPT transmission devices based on the received transmit power level indication signal from the plurality of WPT receiver devices; wherein a minimum power level threshold of the predetermined power level range is determined by a minimum power level needed to provide electric power for an intended functionality of the plurality of WPT receiver devices; and wherein a maximum power level threshold of the predetermined power level range is determined by a maximum power level supported by the power supply specifications of the plurality of WPT receiver devices and wherein controlling the WPT transmission properties includes one or more of controlling individual phases of the radiated sinusoidal or multi-tone output signals of the WPT transmission devices, controlling timing of the transmission during on/off time in duty-cycle operation of the WPT transmission devices, controlling frequency spacing for spread-spectrum emission of the WPT transmission devices and controlling variation of modulation schemes of the RF transmission of the WPT transmission devices.

6. The method of claim 5, wherein a minimum power level threshold of the predetermined power level range is determined by a minimum power level needed to sufficiently provide the plurality of WPT receiver devices with electric power.

7. The method of claim 5, wherein each of the plurality of WPT transmission devices is configured to perform radiative radio frequency (RF) WPT.

8. The method of claim 5, wherein receiving the transmit power level indication signal from the plurality of WPT receiver devices is performed wirelessly.

9. An aircraft comprising a system according to claim 1.

10. The aircraft of claim 9, wherein the WPT receiver device(s) is/are sensors of a wireless aircraft network.

* * * * *